(12) United States Patent
Mai

(10) Patent No.: US 12,655,933 B2
(45) Date of Patent: Jun. 16, 2026

(54) FIXING DEVICE MOUNTING AND DISMOUNTING QUICKLY

(71) Applicant: HuiZhou DeYue Electronic Products Co., Ltd., Huizhou (CN)

(72) Inventor: Yangjun Mai, Huizhou (CN)

(73) Assignee: HuiZhou DeYue Electronic Products Co., Ltd., Huizhou (CN)

( * ) Notice: Subject to any disclaimer, the term of this patent is extended or adjusted under 35 U.S.C. 154(b) by 153 days.

(21) Appl. No.: 18/680,487

(22) Filed: May 31, 2024

(65) Prior Publication Data

US 2025/0320959 A1     Oct. 16, 2025

(30) Foreign Application Priority Data

Apr. 11, 2024     (CN) ......................... 202410432106.2

(51) Int. Cl.
*F16M 13/02*             (2006.01)

(52) U.S. Cl.
CPC ................................... *F16M 13/02* (2013.01)

(58) Field of Classification Search
CPC ...... F16M 13/00; F16M 13/02; F16M 13/022; F16M 13/027; F16M 2200/02; F16B 2/18; H04R 1/025; H04R 1/026; H04R 2201/021; F21V 21/046; F21V 21/045
See application file for complete search history.

(56) References Cited

U.S. PATENT DOCUMENTS

| | | | | |
|---|---|---|---|---|
| 6,588,543 B1 * | 7/2003 | Tchilinguirian | ........ | F21V 21/04 |
| | | | | 362/147 |
| 7,334,767 B2 * | 2/2008 | Wright | ................... | H04R 1/025 |
| | | | | 248/342 |
| 8,485,487 B2 * | 7/2013 | Cheng | .................... | H04R 1/026 |
| | | | | 381/386 |
| 9,084,046 B2 * | 7/2015 | Ivey | ........................ | H04R 1/025 |
| 9,479,852 B2 * | 10/2016 | Yang | ....................... | H04R 1/025 |
| 9,913,013 B1 * | 3/2018 | Santoro | .................. | H02G 3/281 |
| 10,024,493 B2 * | 7/2018 | Hart | ....................... | F16M 13/027 |
| 10,171,897 B2 * | 1/2019 | Hart | ....................... | H04R 1/025 |
| 10,563,816 B1 | 2/2020 | Mai | | |
| 11,064,275 B2 * | 7/2021 | Mai | ............................ | F16B 2/10 |
| 11,293,173 B2 * | 4/2022 | Mai | ...................... | F16B 13/0808 |
| 11,391,310 B2 * | 7/2022 | Hu | .......................... | F21V 21/045 |
| 11,425,478 B2 * | 8/2022 | Hart | ........................ | H04R 1/026 |
| 2009/0324004 A1 * | 12/2009 | Yang | ....................... | H04R 1/025 |
| | | | | 381/395 |
| 2010/0155556 A1 * | 6/2010 | Nelson | ................... | H04R 1/025 |
| | | | | 248/231.51 |

(Continued)

*Primary Examiner* — Monica E Millner

(57)             ABSTRACT

A fixing device mounting and dismounting quickly includes a mounting assembly and at least one fixing assembly, the mounting assembly includes a mounting plate, a fitting cylinder arranged on a bottom surface of the mounting plate, and at least one guiding member perpendicularly extending downward from the bottom surface of the mounting plate. The fitting cylinder attaches to the wall of the mounting hole, the mounting plate is provided on the top surface of a plate around the mounting hole. The guiding member is provided in the fitting cylinder and extends out of the fitting cylinder. The fixing assembly is provided at the guiding member and abuts against the bottom surface of the plate, thereby clamping the plate between the mounting plate and the fixing assembly.

7 Claims, 5 Drawing Sheets

(56) References Cited

U.S. PATENT DOCUMENTS

| | | | | |
|---|---|---|---|---|
| 2016/0366501 A1* | 12/2016 | Ivey | .................... | H04R 1/026 |
| 2019/0226637 A1* | 7/2019 | Mai | .................... | F21V 21/042 |
| 2019/0301668 A1* | 10/2019 | Mai | .................... | F16B 2/18 |
| 2021/0076515 A1 | 3/2021 | Mai | | |

* cited by examiner

FIXING DEVICE MOUNTING AND DISMOUNTING QUICKLY

CROSS-REFERENCE TO RELATED APPLICATION

This application claims priority from the Chinese patent application 202410432106.2 filed Apr. 11, 2024, the content of which is incorporated herein in the entirety by reference.

TECHNICAL FIELD

The present disclosure relates to the technical field of fixed installation, more particularly to a fixing device mounting and dismounting quickly, used for mounting an electronic product on the wall roof or a ceiling.

BACKGROUND

It generally requires a tool or a structure capable of fixing and suspending to install the electronic device, such as an electric lamp, a decorative lamp, a fan, or a sound device, on a ceiling or a walled roof of a house. Generally, a mounting plate is fixed on the ceiling or the wall roof by a screw, and then the electronic device is suspended on the mounting plate. This installation manner makes it easy to damage the ceiling or the wall roof, and is difficult to disassemble after being installed.

Currently, a press fastener is also disposed on the bottom surface of the mounting plate, a spring is disposed in the press fastener, and an elastic force of the spring is used to push the press fastener to press the mounting plate, so as to achieve installation of an electronic device on a ceiling or a wall roof. However, due to the large gravity of the mounting plate and the electronic device, the requirement for the elastic force of the spring is high; in addition, after the spring is used for a long time, the elastic force of the spring is reduced, the spring is flexible, so that the installation of the electronic device is not firm and is easy to loosen.

For this reason, it is necessary to develop a new fixing device that can be quickly mounted and dismounted to overcome the shortcomings of the prior art.

SUMMARY

In order to overcome the defects of the prior art, the disclosure provides a fixing device mounting and dismounting quickly, used for installing an electronic device on the plate, which is configured with a mounting assembly and a fixing assembly to clamp the wall roof or a ceiling therebetween, the fixing device is fixed and not easily loose, is easily mounted and dismounted, to solve the defect of the prior art.

The technology schemes of the disclosure are as follows: a fixing device mounting and dismounting quickly, used for installing the electronic device at the mounting hole of the plate, includes a mounting assembly and at least one fixing assembly, the mounting assembly includes a mounting plate, a fitting cylinder arranged on a bottom surface of the mounting plate, and at least one guiding member perpendicularly extending downward from the bottom surface of the mounting plate. The fitting cylinder attaches to the wall of the mounting hole, the mounting plate is provided on the top surface of the mounting plate around the mounting hole. The guiding member is provided in the fitting cylinder and extends out of the fitting cylinder. The fixing assembly is provided at the guiding member and abuts against the bottom surface of the plate, thereby clamping the plate between the mounting plate and the fixing assembly.

The fixing assembly has a clamping member, there is an acute angle between the clamping member and the guiding member, and the clamping member obliquely abuts against the bottom surface of the plate.

The fixing assembly includes a base mounting on the guiding member and the clamping member pivots with the base.

The two opposite side surfaces of the base are respectively provided with a mounting post, and two ends of a torsion spring are respectively wound around the mounting post; the clamping member includes a main board and two side boards arranged at two sides of the main board, and one end of each of the two side boards is respectively provided with a mounting groove; the mounting post is inserted into the mounting groove so that one end of the clamping member pivots onto the base; the main board is provided with a blocking portion, and a gap is formed between the blocking portion and the main board; the center part of the torsion spring passes through the gap and elastically abuts against the clamping member, so that the other end of the clamping member is tilted towards the mounting plate to abut against the plate, and an acute angle is formed between the clamping member and the guiding member.

The guiding member is a cylinder with a hollow cavity, and a side wall thereof is provided with a long groove in communication with the hollow cavity; a first elastic member is built in the hollow cavity of the guiding member; the base includes a frame and a central post provided at the center of the frame, the central post being connected to the frame via a connection portion; the frame is sheathed outside the guiding member; the connection portion is inserted into and passes through the long groove; the central post is arranged in the hollow cavity, with one end thereof abuts the first elastic member.

The mounting plate is provided with a first through hole in a location that is directly opposite the central post.

A blocking member is further provided at the bottom end of the guiding member; when the base is pushed to moves along the guiding member in a direction away from the mounting plate, the clamping member moves along the same; when the clamping member is in contact with the blocking member and is blocked, thereby rotating around the mounting post in the direction of the guiding member, and is stored under the mounting plate.

The fixing assembly further includes a locking member, located at a side of the guiding member and pivots on the bottom surface of the mounting plate, the locking member is rotated to abut against the base so as to lock the base, or the locking member is pulled to release the base.

The middle part of the locking member is provided with a second through hole, and two opposite ends thereof are respectively provided with a pulling part and a locking part in the direction of the base; a mounting post is provided on the bottom surface of the mounting plate, and the mounting post passes through the second through hole of the locking member, thereby pivoting the locking member onto the mounting post.

The mounting plate is further provided with an accommodating groove between the locking member and the guiding member, a second elastic member is provided in the accommodating groove, and the second elastic member elastically abuts against the locking member.

The beneficial effects of the disclosure are as follows: the fixing device, as long as a mounting hole is reserved on the plate, the plate can be clamped by the mounting assembly and the fixing assembly at the mounting hole, so that the fixing device can be quickly installed on the plate. The assembly-disassembly is simple, convenient, and quick, and the plate is not damaged. The fixing device has a clamping member. The clamping member and the guiding member form the acute angle, that is to say, a right triangle is enclosed among the clamping member, the guiding member and the plate, and the structure is firm so that the clamping member can firmly support the plate without loosing.

EMBODIMENTS

Figure 1:
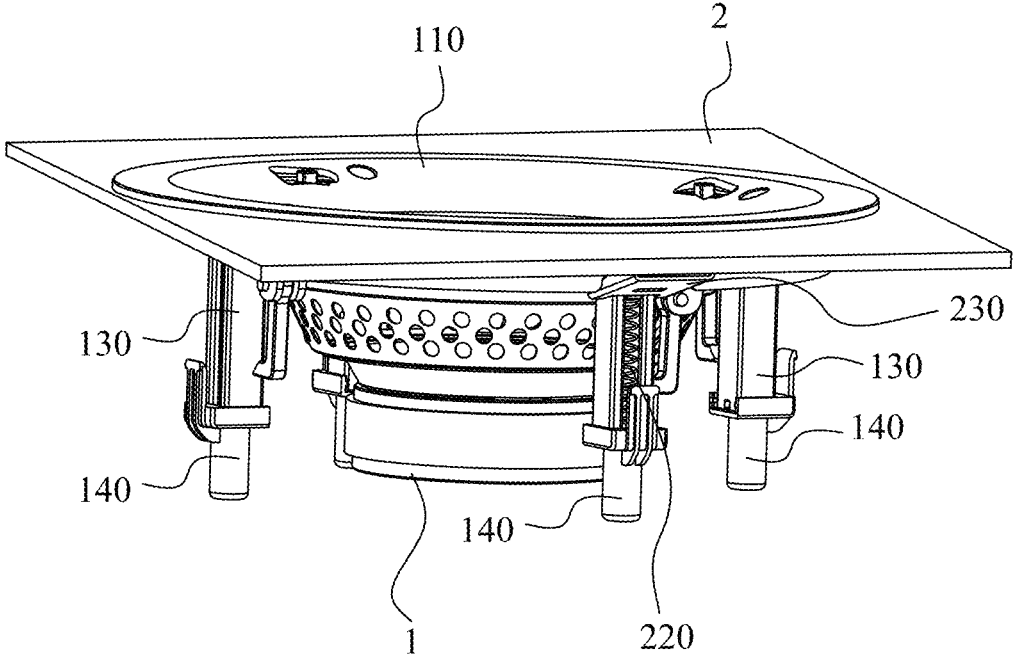
FIG. 1 is a schematic diagram of a fixing device 10 mounted to a plate 2 according to the embodiment in the disclosure.
Figure 2:
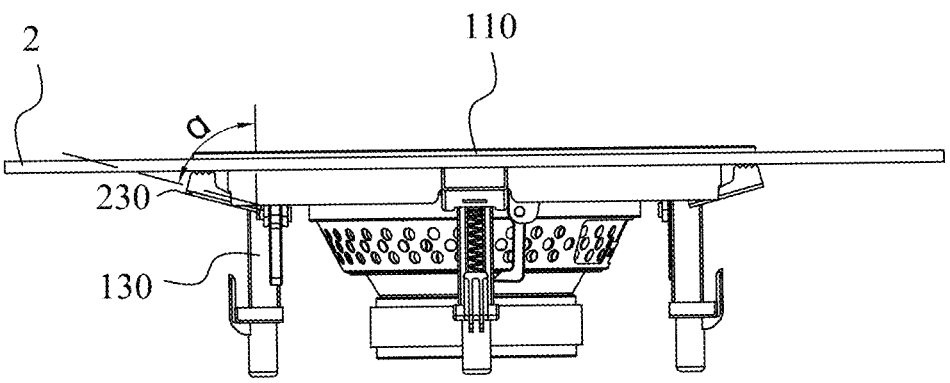
FIG. 2 is a front view of the fixing device 10 shown in FIG. 1

Referring to FIG. 1-4, a fixing device 10 mounting and dismounting quickly, is used for installing the electronic device 11 into the plate 2. The plate 2 can be the ceiling or the wall roof. The plate 2 is provided with the mounting hole 3. The fixing device 20 is mounted in the mounting hole 3, which includes a mounting assembly 100 and at least one fixing assembly 200, the mounting assembly 100 includes a mounting plate 110, a fitting cylinder 120 arranged on a bottom surface of the mounting plate 110, and at least one guiding member 130 perpendicularly extending downward from the bottom of the mounting plate 110. The fitting cylinder 120 attaches to the wall of the mounting hole 3, the mounting plate 110 is provided on the top surface of the plate 2 around the mounting hole 3. The guiding member 130 is provided in the fitting cylinder 120 and extends out of the fitting cylinder 120. The fixing assembly 200 is provided at the guiding member 130 and abuts against the bottom of the plate 2, thereby clamping the plate 2 between the mounting plate 110 and the fixing assembly 200.

Figure 3:
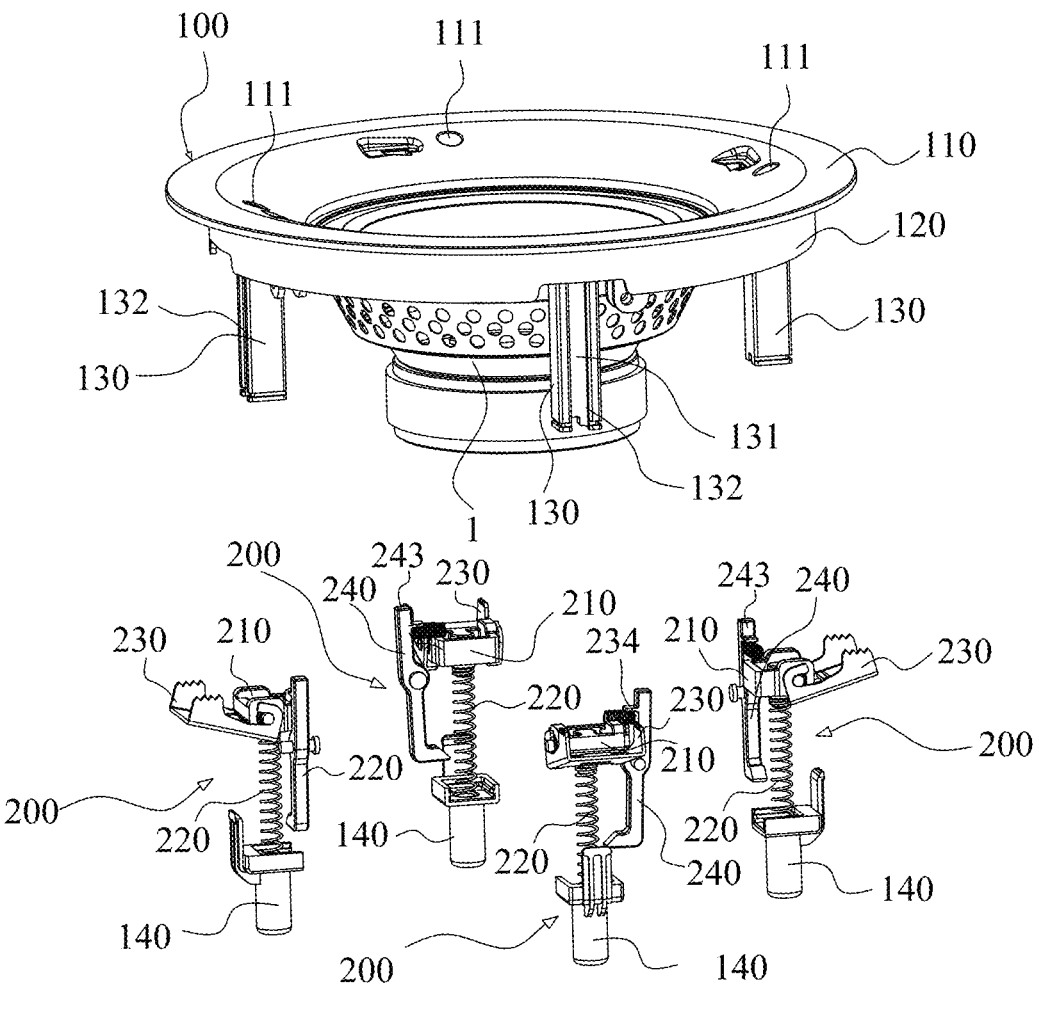
FIG. 3 is an exploded view of the fixing device 10 shown in FIG. 1
Figure 3:
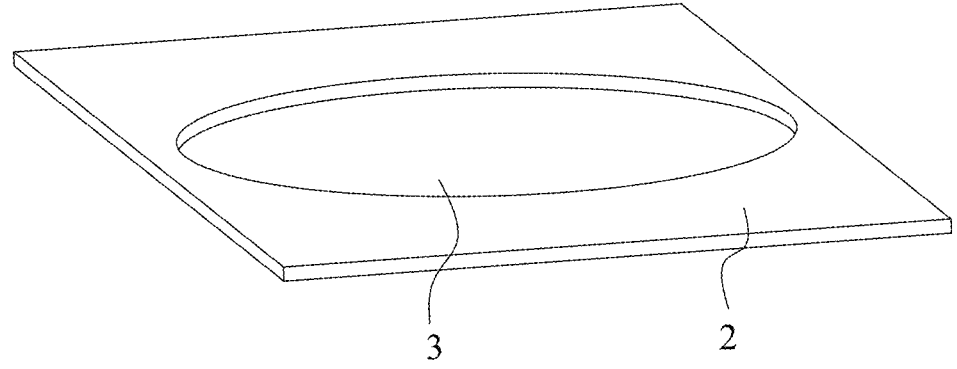

Referring to FIG. 3, the fixing assembly 200 has a clamping member 230, an acute angle α is formed between the clamping member 230 and the guiding member 130, and the clamping member 230 obliquely upwardly abuts against the bottom surface of the plate 2. In other words, a right triangle is formed among the clamping member 230, the guiding member 130 and the plate 2, and the structure is firm, so that the clamping member 230 can firmly support the plate 2 without being loosened.

Figure 5:
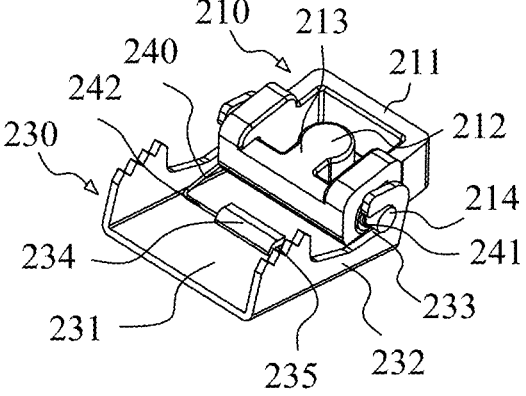
FIG. 5 is a schematic diagram of a combination of the base and the clamping members according to the embodiment in the disclosure.

Referring to FIG. 3 and FIG. 5, the fixing assembly 200 includes a base 210, mounting on the guiding member 130, and the clamping member 230 pivots with the base 210.

Specifically, the two opposite side surfaces of the base 210 are respectively provided with a mounting post 214, and two ends 241 of a torsion spring 240 are respectively wound around the mounting post 214.

Referring to FIG. 5, the clamping member 230 includes a main board 231 and two side boards 232 arranged at two sides of the main board 231, and one end of each of the two side boards 232 is respectively provided with a mounting groove 233; the mounting post 214 is inserted into the mounting groove 233 so that one end of the clamping member 230 pivots onto the base 210; the main board 231 is provided with a blocking portion 234, and a gap 235 is formed between the blocking portion 234 and the main board 231; the central part of the torsion spring 241 passes through the gap 235 and elastically abuts against the clamping member 234, so that the other end of the clamping member 234 can be tilted towards the mounting plate 110 to abuts against the plate 2, and an acute angle α is formed between the clamping member 230 and the guiding member 130. The other end of the clamping member 230 is provided with a claw 235, so that the clamping member 2 can be clamped tightly to the plate 2.

The fixing assembly 200 further includes a first elastic member 220 disposed under the base 210 and elastically abutting against the base 210. During installation, the base 210 is pushed to slide along the guiding member 130 in a direction away from the mounting plate 110 under the action of an external force, and the first elastic piece 220 is compressed, so as to adjust the spacing between the mounting plate 110 and the base 210, so that the spacing is applicable to the plate 2 with different thicknesses. When the plate 2 is to be placed between the base 210 and the mounting plate 110, the base 210 is released, and under the action of the elastic force of the first elastic member 220, the base 210 slides towards the direction of the mounting plate 110 and abuts against the plate 2, so that the plate 2 is clamped between the mounting plate 110 and the base 210. The fixing device 200 can be quickly installed on the plate 2, and the fixing is firm and not loose.

Figure 4:
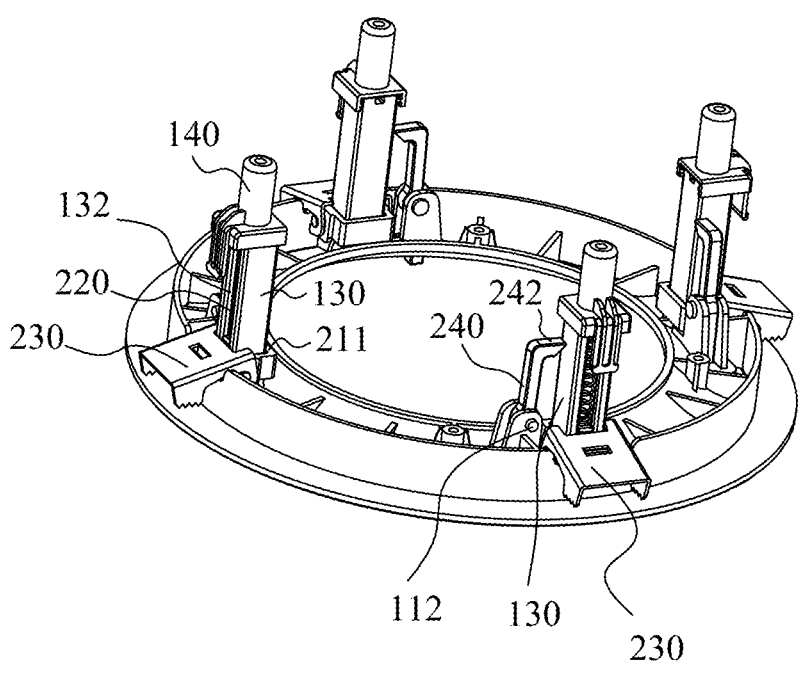
FIG. 4 is a schematic diagram of a fixing device 10 according to the embodiment in the disclosure.

Referring to FIGS. 3-5, the guiding member 130 is a cylinder with a hollow cavity 131, and a side wall thereof is provided with a long groove 132 in communication with the hollow cavity 131; a first elastic member 211 is built in the inner cavity 131 of the guiding member 130; the base 210 includes a frame 211 and a central post 212 provided at the center of the frame 211, the central pillar being connected to the frame 211 via a connection portion 213; the frame 211 is sheathed outside the guiding member 130; the connection portion 212 is inserted into and passes through the long groove 132; the central post 212 is arranged in the hollow cavity 131, one end thereof abuts against the first elastic member 220, the other end abuts against the mounting plate 110 when not used and abuts against the plate 1 when used.

Referring to FIG. 3, the mounting plate 110 is provided with a first through hole 111 in a location that is directly opposite to the central post 212. When installation, the user can insert a mounting tool, such as a pushing rod, into the first through hole 111 to push the base 210, and the first elastic member 220 is compressed, thereby pushing the base 210 to move away from the mounting plate 110.

Figure 6:
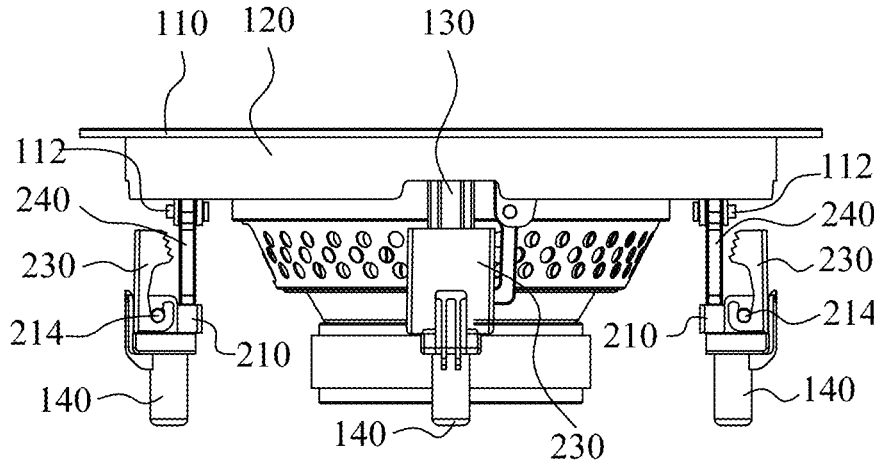
FIG. 6 is a schematic diagram showing that the fixing assemblies 200 are moved to the blocking members 140 before the fixing device 10 is mounted into the plate 2.

Because the clamping member 230 is disposed on one side of the base 210 and clamps the plate 2 together with the mounting plate 110, the orthographic projection of the clamping member 230 on the mounting plate 110 may be located outside the mounting plate 110, or the clamping member 230 may extend out of the periphery of the mounting plate 110. Therefore, during installation, it may be difficult for the clamping member 230 to pass through the mounting hole 3 on the plate 1 due to the large size of the clamping member 230. To this end, the bottom end of the guiding member 130 is further provided with a blocking member 140. As shown in FIG. 6, when the base 210 is pushed to move along the guiding member 130 in a direction away from the mounting plate 110, the clamping member 230 is moved with the base 210 until contact with the blocking member 140 and is blocked by the blocking member 140, thereby being rotated around the mounting post 214 in the direction of the guiding member 130 and accommodated below the mounting plate 110, so that the fixing device 10 can pass through the mounting hole 3, the mounting plate 110 can be placed on the plate 2, and the fixing assembly 200 is placed under the plate 2.

Figure 7:
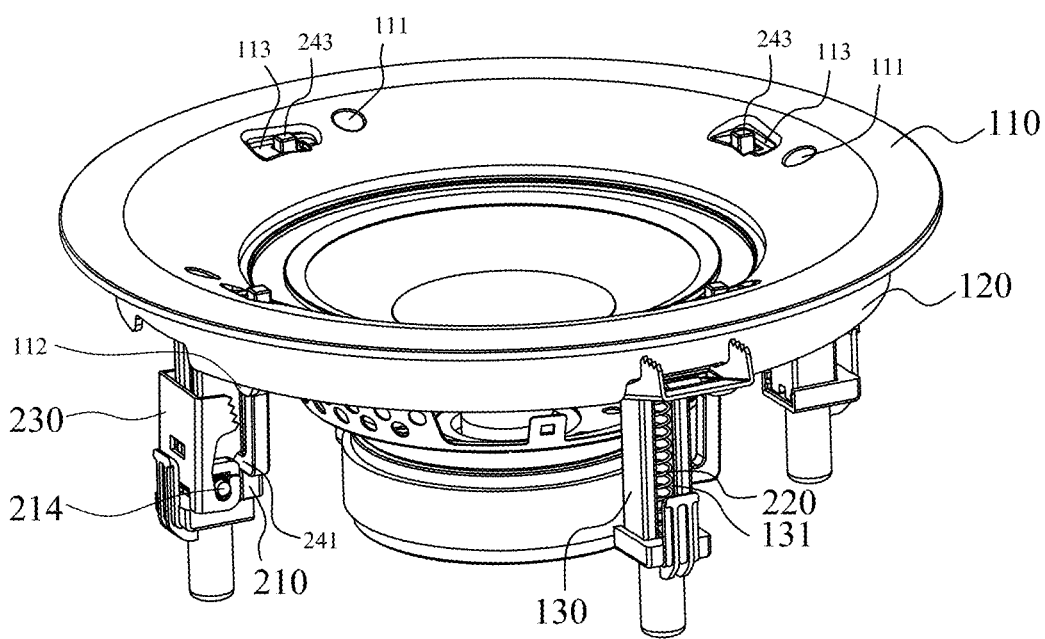
FIG. 7 is the other schematic diagram showing that one of the fixing assemblies 200 is moved to the blocking member 140, the other one of the fixing assemblies 200 is not.

Referring to FIG. 7, the blocking member 140 is provided at the bottom end of the guiding member 130 and used for abutting against the first elastic member 220.

Referring to FIGS. 3, 4, and 6, the fixing assembly 200 further includes a locking member 240, the locking member is located at the side of the guiding member 130 and pivots at the bottom surface of the mounting plate 10, used for locking or releasing the base 210.

Specifically, referring to FIG. 6, when the base 210 moves to an appropriate position along the guiding member 130, the locking member 240 locks the base 210 so that it can not move under the action of the elasticity force of the first elastic member 210. After the plate 2 is placed between the mounting plate 110 and the base 210, the locking member 240 releases the base 210, and the first elastic member 220 pushes the base 210 to move towards the plate 2 so that the base 210 and the mounting plate 110 clamp the plate 2 together.

Figure 8:
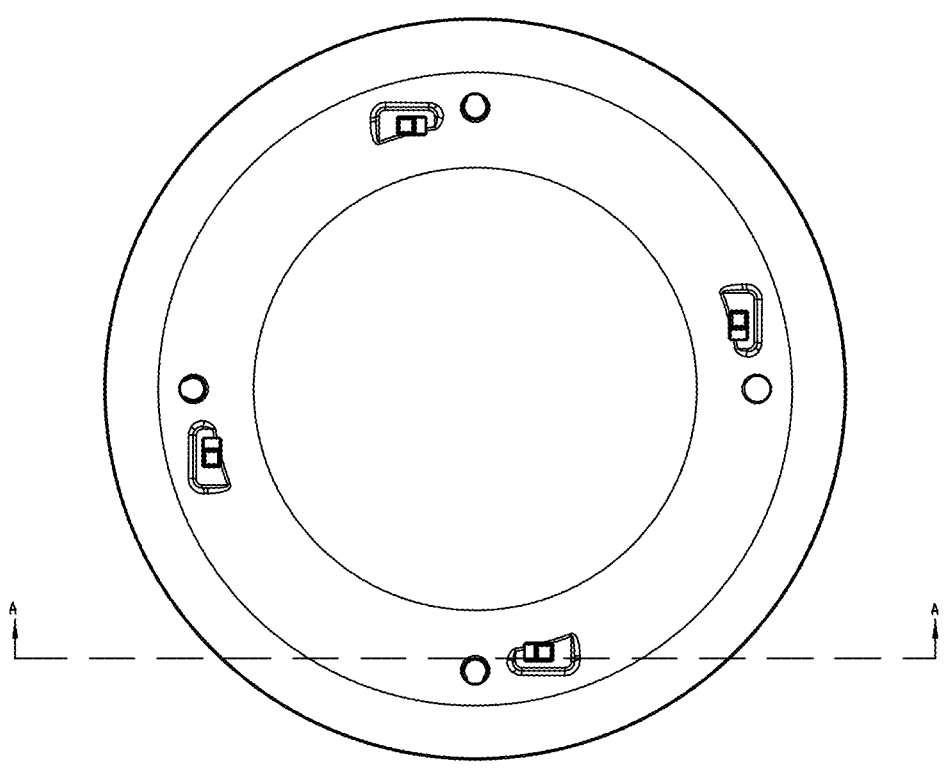
FIG. 8 is a combined schematic diagram of the mounting plate and the pulling part.
Figure 9:
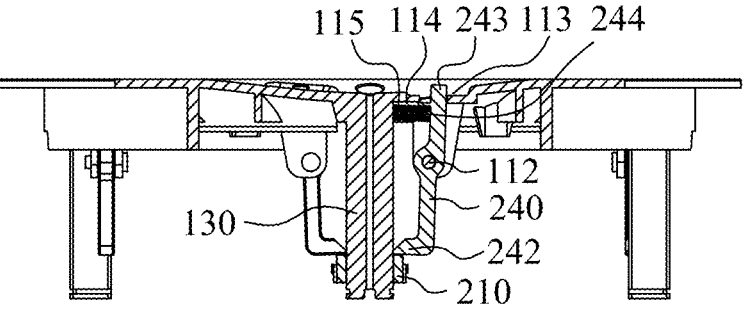
FIG. 9 is a sectional view along line A-A in FIG. 8.

Referring to FIGS. 8 and 9, the middle part of the locking member 240 is provided with a second through hole (not shown), and two opposite ends thereof are respectively provided with a pulling part 243 and a locking part 242 in the direction of the base 210; a mounting post 112 is provided on a bottom surface of the mounting plate 110, and the mounting post 112 passes through the second through hole of the locking member 240, thereby pivoting the locking member 240 onto the mounting post 112. The mounting plate 110 is provided with a third through hole on a position corresponding to the locking member 240, the pulling part 243 extends out of the third through hole 113, facilitating the user to toggle the locking member 240 to rotate, so that the locking part 242 abuts against the base 210 to lock it, or releases it. The mounting plate 10 is further provided with an accommodating groove 114 between the locking member 240 and the guiding member 130. The locking member 240 is provided with a convex column 244 below the pulling part 243, the convex column 244 faces to the accommodating groove 114. A second elastic member 115 is contained in the accommodating groove 114, sleeved on the convex column 244 and elastically supporting the shifting part 243. When the locking part 242 supports the base 210, the second elastic member 115 elastically abuts against the pulling part 243 in the opposite direction, so that the locking part 242 can continuously abut against the base 210, thereby locking the base 210. Or the pulling part 243 is pulled to take off the base 210, so that the base can slide along the guiding member 220 in a direction towards the mounting plate 110 under the action of the elastic force of the first elastic member 220 so that the plate 2 is clamped.

The fixing device 10 is in use, a push rod is used to push the base 210 against the elastic force of the first elastic element 220 so as to move along the guiding member 130 in a direction away from the mounting plate 110. The clamping member 230 moves with the base 210 until the blocking member 140 contacts and blocks the clamping member 230, overcoming the elastic force of the torsion spring 240, so that the clamping member 230 moves around the mounting post 214 towards the guiding member 130, and is accommodated under the mounting plate 110.

The locking member 240 is pulled so that the locking portion 242 abuts against the base 210 to lock the base 210 so that the base 210 cannot move towards the mounting plate 110 under the action of the elastic force of the first elastic member 220. The fixing device 10 is placed at the mounting hole 3 of the plate 2 so that the mounting plate 110 is placed on the plate 2 at a hole of the mounting hole 3, the fitting cylinder 120 is attached to the mounting hole 3, and the guide member 130 is located below the mounting hole 3.

The locking member 240 is pulled to release the base 210, the base 210 moves towards the mounting plate 110 under the action of the torsion spring 240 so that the clamping member 230 disengages from the blocking member 140, then, under the action of the torsion spring 240, the other end of the clamping member 230 rotates in a direction away from the guiding member 130, and the ratchet teeth on the other end of the clamping member 230 abut against the plate 2, so that the fixing device 10 is fixedly installed on the plate 2. That is, the electronic device mounted on the fixing device 10 is mounted on the plate 2. The mounting method is simple and convenient, and the mounting is firm.

The invention claimed is:

1. A fixing device mounting and dismounting quickly, comprising:
    an mounting assembly;
    at least one fixing assembly;
    wherein said mounting assembly comprising:
    a mounting plate, a fitting cylinder arranged on a bottom surface of said mounting plate, and at least one guiding member perpendicularly extending downward from said bottom surface of the mounting plate;
    said fitting cylinder attaches to a mounting hole in a plate, said mounting plate is provided on a top surface of a plate around said mounting hole;
    said guiding member is provided in said fitting cylinder and extends out of said fitting cylinder; and
    said fixing assembly is provided at said guiding member and abuts against a bottom surface of said plate, thereby clamping said plate between said mounting plate and said fixing assembly;
    wherein said fixing assembly has a clamping member, there is an acute angle between said clamping member and said guiding member, said clamping member obliquely abuts against a bottom surface of said plate;
    wherein said fixing assembly has a base mounting on said guiding member, and said clamping member pivots with said base;
    wherein said guiding member is a cylinder with a hollow cavity, and a side wall thereof is provided with a long groove in communication with said hollow cavity; a first elastic member is built in said hollow cavity of the guiding member; said base includes a frame and a central post provided at a center of said frame, said central post being connected to said frame via a connection portion; said frame is sheathed outside said guiding member; said connection portion is inserted into and passes through said long groove; said central post is arranged in said hollow cavity, with one end thereof abuts said first elastic member.

2. The fixing device according to claim 1, wherein two opposite side surfaces of said base are respectively provided with a mounting post, and two ends of a torsion spring are respectively wound around said mounting post; said clamping member includes a main board and two side boards arranged at two sides of said main board, and one end of each of said two side boards is respectively provided with a mounting groove; said mounting post is inserted into said mounting groove so that one end of said clamping member pivots onto said base; said main board is provided with a blocking portion, and a gap is formed between said blocking portion and said main board; a central part of said torsion spring passes through said gap and elastically abuts against said clamping member so that the other end of said clamping member is tilted towards said mounting plate to abut against said plate.

3. The fixing device according to claim 1, wherein said mounting plate is provided with a first through hole in a location directly opposite to said central post.

4. The fixing device according to claim 1, wherein a blocking member is further provided at a bottom end of said guiding member; when said base is pushed to move along said guiding member in a direction away from said mounting plate, said clamping member moves along with said base; when said clamping member is in contact with said blocking member and is blocked, thereby rotating around said mounting post in a direction of said guiding member, and is stored under said mounting plate.

5. The fixing device according to claim 1, wherein said fixing assembly further comprises a locking member, located at a side of said guiding member and pivots on said bottom surface of said mounting plate, said locking member is rotated to abut against said base so as to lock said base, or said locking member is pulled to release said base.

6. The fixing device according to claim 1, wherein a middle part of said locking member is provided with a second through hole, and two opposite ends thereof are respectively provided with a pulling part and a locking part in a direction of said base; a mounting post is provided on said bottom surface of said mounting plate, and said mounting post passes through said second through hole of said locking member, thereby pivoting said locking member onto said mounting post.

7. The fixing device according to claim 5, wherein said mounting plate is further provided with an accommodating groove between said locking member and said guiding member, a second elastic member is provided in said accommodating groove, and said second elastic member elastically abuts against said locking member.

* * * * *